Oct. 5, 1965 L. J. MURDOCK 3,210,494
EMERGENCY CUT OFF DEVICE ACTUATED BY MOVEMENT OF OPERATOR
Filed Nov. 1, 1963
2 Sheets-Sheet 1
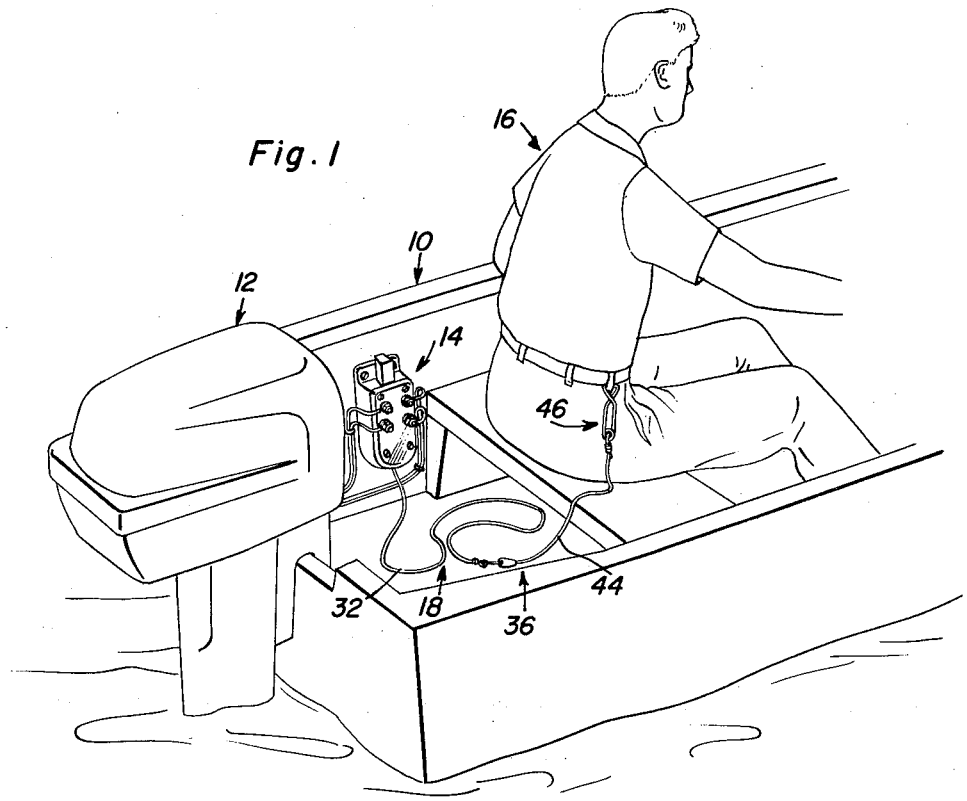
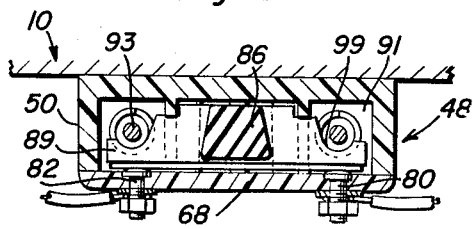
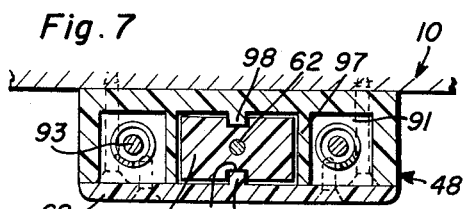
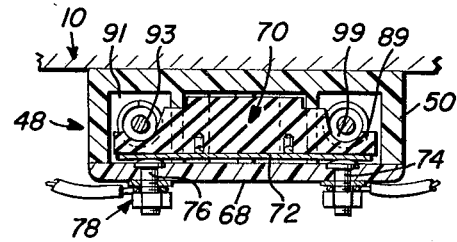
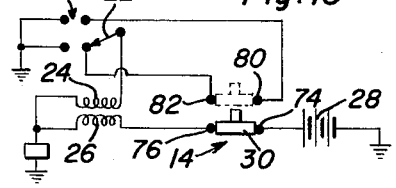
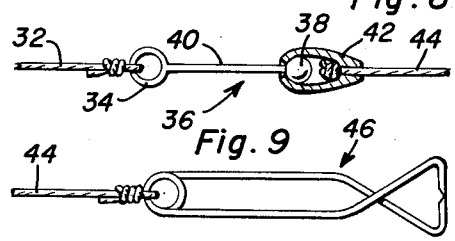
Louis J. Murdock
INVENTOR.

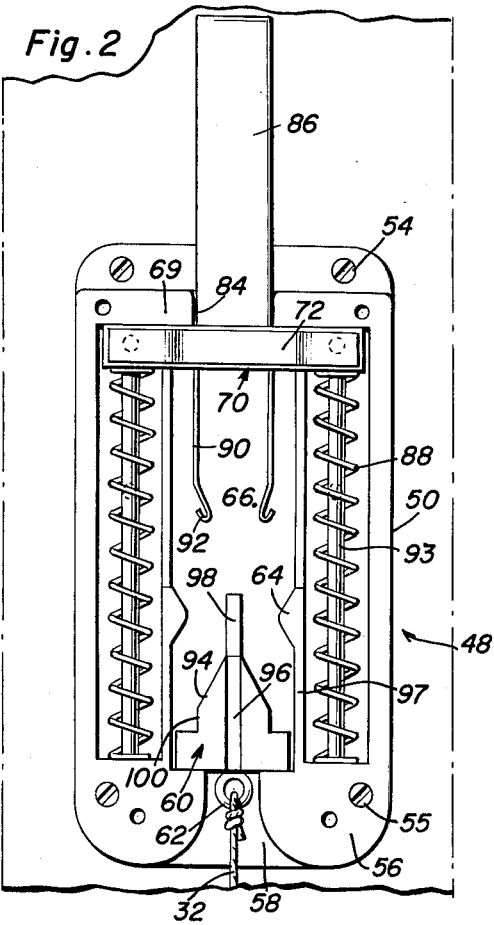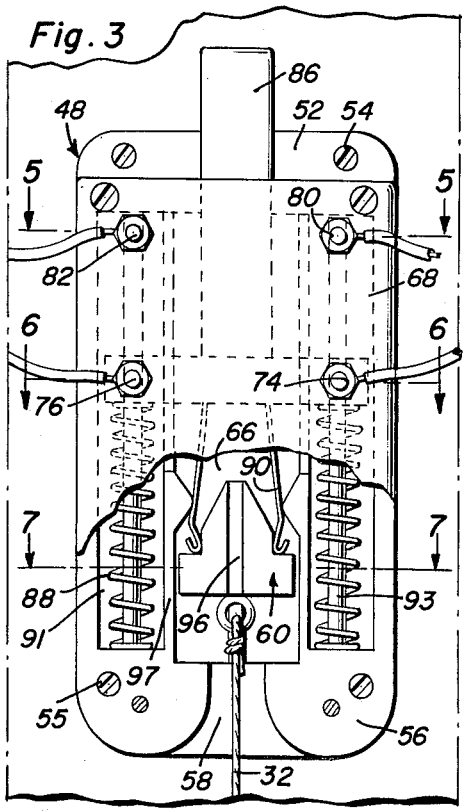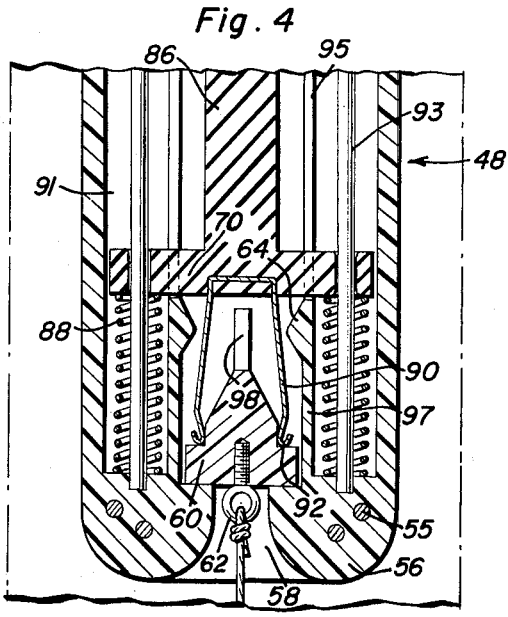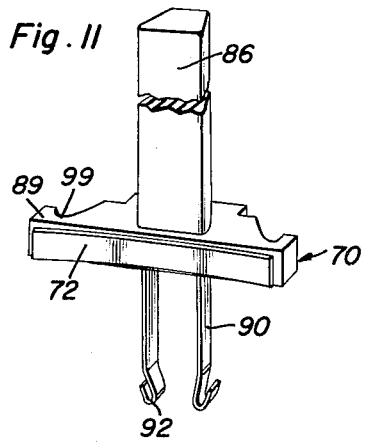
Louis J. Murdock
INVENTOR.

United States Patent Office 3,210,494
Patented Oct. 5, 1965

3,210,494
EMERGENCY CUT OFF DEVICE ACTUATED BY
MOVEMENT OF OPERATOR
Louis J. Murdock, 2351 City View St., Eugene, Oreg.
Filed Nov. 1, 1963, Ser. No. 320,913
8 Claims. (Cl. 200—61.19)

This invention relates to emergency cut-off power plants which are either stationary or of the propelling type for vehicles including land and marine vehicles.

Emergency engine cut-off devices have heretofore been devised but have proved to be unsatisfactory in that they were either unreliable in operation or actuated unintentionally under severe vibratory conditions. Also, prior engine cut-off devices were limited in installation, and restricted in use to particular engines. It is therefore the primary object of the present invention to provide an emergency engine disabling apparatus which is not restricted in installation or use to any particular type of engine.

Another object of the present invention is to provide an emergency cut-off device for power plants of all types employing an electrical circuit for maintaining operation thereof and operative to disable operation of the power plant when the operator has moved away by a predetermined distance from a control position, the arrangement being such as to avoid imposing any unnecessary restraint on the operator. Thus, the operator need not be permanently anchored to the control position.

A further object of the present invention is to provide an engine cut-off device which will be reliably actuated to disable operation of a power plant by a pull coming from any direction and yet will not be unintentionally actuated because of severe vibrations to which the engine installation is subjected.

A still further object of the present invention is to provide an emergency cut-off device for power plants which may be selectively operated for easy resetting thereof.

Yet another object of the present invention is to provide a cut-off device for disabling operation of power plants by circuit breaking and/or contact making operation so as to suit different requirements. Also, safe operation of the cut-off device is assured by a full enclosure of the parts thereof so as to avoid sparking hazards during circuit breaking or contact making operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a partial perspective view of one typical installation for the emergency power plant-cut-off arrangement of the present invention.

FIGURE 2 is a front elevational view of the cut-off device in a circuit closing position with the cover lid removed.

FIGURE 3 is a front elevational view similar to that of FIGURE 2 but with a portion of the cover lid broken away and illustrating the cut-off device in a circuit closing condition.

FIGURE 4 is a partial longitudinal sectional view illustrating the cut-off device in a release condition.

FIGURES 5, 6 and 7 are transverse sectional views taken substantially through planes indicated by section lines 5—5, 6—6 and 7—7 in FIGURE 3.

FIGURE 8 is a partial sectional view of the emergency actuating facilities for the cut-off device.

FIGURE 9 is a side elevational view of the anchoring portion of the actuating facilities.

FIGURE 10 is a simplified electrical circuit diagram illustrating a typical operation sustaining circuit for power plants to which the present invention is applicable.

FIGURE 11 is a perspective view of a disassembled portion of the cut-off device.

Referring now to the drawings in detail, it will be observed that one typical installation for the emergency power plant cut-off system of the present invention is shown including a marine vehicle such as the motor driven boat 10 having an outboard engine 12 to which the cut-off device 14 is electrically connected. The cut-off device 14 may be mounted in fixedly spaced relation to the power plant 12 at any desired location in the vehicle convenient to the operator 16. Cut-off actuating facilities generally referred to by reference numeral 18 may then be anchored to the operator so that if and when the operator is unintentionally thrown from the boat or vehicle he will be released from the actuating facilities 18. However, before release occurs, the cut-off device 14 will be actuated so as to promptly disable operation of the power plant and thereby avoid unnecessary damage to the vehicle or boat 10 and to other vehicles or persons that could otherwise be damaged or injured by collision.

Actuation of the cut-off device 14 may be operative to disable operation of power plants of different types having electrical control circuits for sustaining operation thereof. For example, as shown in FIGURE 10, the power plant may be of the internal combustion type provided with grounded spark plugs 20, the spark producing contacts of which are supplied with arc producing potentials by the rotating distributor arm 22 connected to the ignition secondary 24. Accordingly, engine operation is maintained when the ignition primary 26 is connected to the source of voltage 28. The ignition circuit is maintained closed by the contact establishing member 30 of the cut-off device 14 in its circuit closing condition. The primary ignition circuit will therefore be opened when the cut-off device is in its circuit disabling condition as shown by dotted lines in FIGURE 10 in order to stop engine opration. Alternatively, where the ignition circuit is not exposed, operation may be stopped by shunting the spark plugs 20 so that in the circuit disabling condition of the cut-off device, contact is established. This latter mode of disabling operation may be necessary in connection with engines provided with a magneto for controlling spark ignition. Accordingly, the cut-off device 14 of the present invention is provided with two sets of fixed contacts which are electrically bridged in both the circuit closing and circuit disabling conditions of the device so that it will suit all requirements.

With respect to the cut-off device of the present invention, there is also no critical location for mounting thereof inasmuch as the cut-off device may be actuated by a pull coming from any direction. The actuating facilities 18 therefore includes a flexible actuating cable or cord 32 directly connected at one end to the cut-off device and at the other end to the eye portion 34 of a releasable connector generally referred to by reference numeral 36 as more clearly seen in FIGURE 8. The releasable connector therefor includes a ball portion 38 connected to the eye portion 34 by a shank 40, the ball portion being enclosed within a connector element 42 which is anchored to one end of an elongated flexible anchoring cord or cable 44. The other end of the cable 44 is connected to an anchoring clip 46 by means of which the cable 44 may be attached to the clothing of the operator 16 as shown in FIGURE 1. The releasable connector assembly 36 is so designed that it will release when a pull is exerted on the cable 44 by the operator which exceeds the force necessary to actuate the cut-off device 14 yet does not exceed the tensile strength of the cable 32 or cable 44. It will therefore be apparent that should the operator be thrown from the boat 10, the momentary pull will be transferred to the cable 32 sufficient to actuate the cut-off device after which the connector 36 will release so as to prevent the operator from being dragged by continued movement of the boat. Also, the pull exerted through the cable 32 which actuates the cut-off device, may come from any direction so that actuation of the cut-off device is assured regardless of the installational mounting of the cut-off device in the boat.

Referring therefore to FIGURES 2 through 7 in particular, it will be observed that the cut-off device is provided with an enclosure generally referred to by reference numeral 48 preferably made of electrically non-conductive material. The enclosure includes a housing 50 having an upper flange portion 52 by means of which the enclosure may be secured to the vehicle by fasteners 54. The lower end portion 56 of the housing has a downwardly flaring passage 58 through which the flexible cable 32 extends, said lower end portion being secured to the vehicle by fasteners 55. The walls of the passage 58 are formed by a smooth curvature surface so that no binding of the cable 32 will occur regardless of the direction of pull. The inner end of the cable 32 is connected to the lower end of a displacing member 60 by any suitable means such as the threaded eye member 62. The displacing member 60 is therefore mounted within the housing for movement between a set position as illustrated in FIGURE 3 spaced from fixedly mounted projections 64 and a reset position abutting the end portion 56 as illustrated in FIGURE 4. The projections 64 are fixedly mounted in vertically spaced relation above the end portion 56 to form a narrow throat intermediate a central cavity portion 66 within the housing closed by the closure lid 68. Also mounted within the enclosure between the upper end portion 69 and the projections 64, is a contact establishing member 70 made of non-conductive material. The contact establishing member as more clearly seen in FIGURE 11 mounts on a front face thereof, an electrically conductive strip 72 by means of which electrical contact is established between fixed contact elements 74 and 76 mounted on the lid 68, when the cut-off device is in the circuit closing condition illustrated in FIGURES 3 and 6. Accordingly, the fixed contact elements 74 and 76 project through apertures formed in the lid 68 for contact with the strip 72 and are held in fixed position by terminal connecting elements 78 by means of which electrical conductor leads are connected to the fixed contact elements. A second set of fixed contact elements 80 and 82 are vertically spaced above the contact elements 74 and 76 so that when the cut-off device is in the circuit disabling condition illustrated in FIGURE 2, the conductive strip 72 will electrically bridge these latter contact elements for purposes hereinbefore indicated. In the circuit disabling condition, the contact establishing member 70 will be abutting the upper portion 69 so as to limit movement of the member 70 to this position. The upper portion is therefore provided with a central opening 84 through which a reset plunger element 86 projects, said plunger element being connected to the contact establishing member 70. In this manner the contact establishing member 70 may be selectively displaced downwardly against the bias of a pair of coil spring members 88 which react between the lateral end portions 89 of the contact establishing member 70 and the bottom portion 56 of the housing so as to continuously impose an upward bias on the contact establishing member toward the circuit disabling position. Lateral spring cavities 91 are provided in the housing within which guide rods 93 are mounted for holding the springs in place. The bias imposed by the springs 88 will of course increase as they are compressed from the position illustrated in FIGURE 2 to the position illustrated in FIGURE 3 with maximum compression occurring when the spring is compressed to the condition illustrated in FIGURE 4. In the release position illustrated in FIGURE 4, the contact establishing member 70 will be at its lower limit of movement at which time the displacing member 60 will be in its reset position. The slots 95 in the walls 97 partitioning the cavities 66 and 91, permit movement of the member 70 with the end portions 89 being provided with arcuate cut-outs 99 for guiding reception of the guide rods 93.

Referring now to FIGURES 2 through 4 and 7, it will be observed that the displacing member 60 is releasably connected to the contact establishing member 70 by means of a releasable latch means. The latch means includes a pair of spring arms 90 secured to the contact establishing member and projecting vertically downwardly therefrom. The spring arms also taper downwardly toward gripping end portions 92 so that the arms may be elastically deformed or spread apart when engaging an upwardly tapering cam formation 94 centrally connected to the top of the displacing member 60. A pair of grooves 96 are formed in the member 60 for receiving the guide projections 98 and 101 formed respectively on the housing 50 and the lid 68. Accordingly, guidance for relative sliding movement between the member 60 and the enclosure is provided. It will therefore be apparent, that when the contact establishing member 70 is slidably displaced toward the displacing member 60 for resetting purposes, the ends 92 will engage the cam formation 94 spreading the spring arms 90 until the ends 92 grip the portion 100 as shown in FIGURE 4. The springs 88 will then be compressed so that upon release of the reset plunger 86, the member 60 will be carried upwardly a short distance with the member 70 to the position shown in FIGURE 3.

It will be observed that the projection 64 form the throat through which the spring arms may pass only when in the contracted condition. When spread apart however, the projections engage the arms 90 so as to lock the ends 92 to the member 60 and prevent further upward movement of the member 70 from the operative position illustrated in FIGURE 3.

From the foregoing description, the construction, operation and utility of the emergency power plant cut-off system will be apparent. When the cut-off device 14 is in the condition illustrated in FIGURE 3, the fixed contacts 74 and 76 will be bridged by the conductive strip 72 on the contact establishing member 70 which will be held in its illustrated position against the bias of the springs 88 in view of the locking action of the projections 64 to also hold the displacing member 60 latched and prevent unintentional release of the member 60. The cut-off device will therefore resist any unintentional actuation from its circuit closing condition. When however, the requisite pull is applied to the flexible actuating cable 32 as hereinbefore indicated, the displacing member 60 will be downwardy displaced from its set position illustrated in FIGURE 3 to its reset position illustrated in FIGURE 4. The spring arms 90 will then contract. The contact establishing member 70 will then be displaced upwardly by the springs 88 away from the displacing member 60 toward the circuit disabling position illustrated in FIGURE 2. It will therefore be apparent that a momentary pull on the actuating cable 32 will be sufficient to release the latch means so that the contact establishing member will move to the circuit disabling position without requiring any sustained pull. To thereafter reset the cut-off device, it will only be necessary for a person to engage the reset plunger 86 pushing it downwardly until the contact member 70 is in release position illustrated in FIGURE 4 in order to relatch the latch means. Without any pull or tension existing on the cable 32, release of the reset plunger 86 will then permit the springs 88 to upwardly displace the contact establishing member 70 together with the displacing member 60 to the set position shown in FIGURE 3.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. A circuit disabling switch device comprising, an enclosure, contact establishing means mounted in said enclosure for movement between a circuit disabling position and a circuit closing position and a reset position, means mounted in said enclosure for continuously biasing the contact establishing means to said circuit disabling position, actuating means movably mounted in said enclosure for limited displacement, latch means mounted on the contact establishing means and engageable with the actuating means in the reset position for releasably connecting the contact establishing means to the actuating means and locking means mounted in the enclosure and engageable with the latch means for preventing release thereof and limiting movement of the contact establishing means to said circuit closing position by the biasing means.

2. The combination of claim 1 including reset means connected to the contact establishing means and projecting from the enclosure for selectively displacing the contact establishing means to said reset position.

3. The combination of claim 2 wherein said enclosure includes an end portion having a diverging passage through which said actuating means extends.

4. The combination of claim 3 wherein said latch means comprises, a pair of elastic arms connected to said contact establishing means for displacement therewith, each of said arms having a gripping end portion, a cam member fixed to said actuating means for engagement by the gripping end portions as the contact establishing means is displaced relative to and toward the actuating means, said cam member being operative to spread the arms for engagement by the locking means.

5. The combination of claim 4 wherein said locking means comprises projection means fixedly mounted in the enclosure having a passage portion through which the latch means may pass only in the contracted condition of the arms, said actuating means being limited in movement between a set and a reset position respectively latched to the contact establishing means and abutting said end portion of the enclosure.

6. The combination of claim 1 wherein said latch means comprises, a pair of elastic arms connected to said contact establishing means for displacement therewith, each of said arms having a gripping end portion, a cam member fixed to said actuating means for engagement by the gripping end portions as the contact establishing means is displaced relative to and toward the actuating means.

7. The combination of claim 6 wherein said enclosure includes an end portion having a diverging passage through which said actuating means extends.

8. The combination of claim 7 wherein said locking means comprises, projection means fixedly mounted in the enclosure having a throat portion through which the latch means may pass only in the contracted condition of the arms, said actuating means being limited in movement between a set and a reset position respectively latched to said contact establishing means and abutting said end portion of the enclosure.

References Cited by the Examiner

UNITED STATES PATENTS 2,802,074  8/57  Pass _____ 200—61.19

BERNARD A. GILHEANY, *Primary Examiner.*

ROBERT K. SCHAEFER, *Examiner.*